United States Patent
Kim et al.

(10) Patent No.: US 9,088,631 B2
(45) Date of Patent: Jul. 21, 2015

(54) GAME STREAMING SYSTEM AND METHOD OF SUPPORTING THE MULTIUSER AND MULTIPLATFORM

(75) Inventors: Kyoung Il Kim, Seoul (KR); Chang Sik Cho, Daejeon (KR); Su Young Bae, Daejeon (KR); Chang Joon Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 15 days.

(21) Appl. No.: 13/620,531

(22) Filed: Sep. 14, 2012

(65) Prior Publication Data
US 2013/0137520 A1 May 30, 2013

(30) Foreign Application Priority Data
Nov. 25, 2011 (KR) .................... 10-2011-0124259

(51) Int. Cl.
*A63F 13/00* (2014.01)
*H04L 29/06* (2006.01)
*A63F 13/30* (2014.01)

(52) U.S. Cl.
CPC ............ *H04L 65/4069* (2013.01); *A63F 13/12* (2013.01); *A63F 2300/534* (2013.01); *A63F 2300/538* (2013.01)

(58) Field of Classification Search
CPC .............. A63F 13/12; A63F 2300/577; A63F 2300/6009; A63F 13/25; A63F 13/26; A63F 13/27
USPC .......................... 463/40–42, 30–33; 709/231
See application file for complete search history.

(56) References Cited

U.S. PATENT DOCUMENTS

| 6,557,041 B2 | 4/2003 | Mallart | |
|---|---|---|---|
| 2003/0032479 A1* | 2/2003 | LeMay et al. | 463/32 |
| 2009/0124387 A1* | 5/2009 | Perlman et al. | 463/42 |

FOREIGN PATENT DOCUMENTS

| KR | 1020070061242 A | 6/2007 |
|---|---|---|
| KR | 100830852 B1 | 5/2008 |
| KR | 1020080085008 A | 9/2008 |
| KR | 1020100117043 A | 11/2010 |
| KR | 1020100117044 A | 11/2010 |
| KR | 1020110116782 A | 10/2011 |

OTHER PUBLICATIONS

Choong-Gyoo Lim et al., "Technology Trends of Cloud Computing-based Game Streaming", Analysis of Electronics and Telecommunications Trends, Feb. 2011, pp. 47-56, vol. 26, No. 1, Electronics and Telecommunications Research Institute.

* cited by examiner

*Primary Examiner* — Ronald Laneau
*Assistant Examiner* — Ross Williams

(57) ABSTRACT

The present disclosure relates to a game streaming system and method for supporting multiuser and multiplatform, and more particularly to a game streaming system and method for supporting multiuser and multiplatform, which executes a game for multiuser in a server computer having high performance in an online game and transfers multiple game result images and game sound to a client terminal of a corresponding user by using real-time encoding and streaming.

17 Claims, 4 Drawing Sheets

GAME STREAMING SYSTEM AND METHOD OF SUPPORTING THE MULTIUSER AND MULTIPLATFORM

CROSS-REFERENCE TO RELATED APPLICATIONS

This application is based on and claims priority from Korean Patent Application No. 10-2011-0124259, filed on Nov. 25, 2011, with the Korean Intellectual Property Office, the disclosure of which is incorporated herein in its entirety by reference.

TECHNICAL FIELD

The present disclosure relates to a game streaming system and method for supporting multiuser and multiplatform, and more particularly to a game streaming system and method for supporting multiuser and multiplatform, which executes a game for multiuser in a server computer having high performance in an online game and transfers multiple game result images and game sound to a client terminal of a corresponding user by using real-time encoding and streaming.

BACKGROUND

According to the rapid development of communication technology and the improvement of a wired/wireless network environment, release of a set-top box, a smart device, and a mobile terminal has expanded. Performance of hardware of terminals has also improved, but it is difficult to smoothly execute various game contents, as is done in a high-performance personal computer (PC), due to size, volume and weight limitations of the terminal.

In the meantime, as an online game market annually grows and investment costs and time for developing a game increase, the quantity of data and rendering of developed game contents becomes massive and higher performance of hardware of a terminal for executing game contents has increased in demands.

In such an environment, a user wishes to enjoy a desired game by using various terminals regardless of whether a place has wired/wireless Internet available. However, in order to transplant various game contents developed for a PC and a game console into the terminals, additional transplant expenses and operations are demanded.

Especially, in a case of a light and small terminal, such as a mobile terminal and a smart terminal, the type of hardware and software of a system is significantly influential, such that a process of the transplant is difficult, and there is difficulty in that all terminals are required to be re-configured even if a system environment is slightly changed.

However, existing online games are single server/client-based games demanding a high specification client environment and especially exert significant influence on functions and performance of a provided game service according to performance of the client. That is, in order to execute the game in the client, high performance of hardware resources, such as a processor, a memory, storage space and a graphic card, is required, and thus the resource is inevitably unnecessarily wasted and there is a limitation in the support of multiple users.

SUMMARY

The present disclosure has been made in an effort to provide a game streaming server and a game streaming method capable of supporting a game content having a calculation load amount regardless of a hardware resource of a client.

An exemplary embodiment of the present disclosure provides a game streaming server including: a game executer configured to execute a game according to a game event requested by a user terminal; a display unit configured to display contents of the game executed in the game executer in one area among a plurality of areas; a capture unit configured to capture the game displayed in the display unit; and a transmitter configured to transmit the captured game to the user terminal.

Another exemplary embodiment of the present disclosure provides a game streaming server configured to execute a game according to a game event requested by a user terminal, display a result of the executed game on a set area of a display unit, capture a displayed image and sound, and transmit the captured image and sound to the corresponding user terminal in real time.

Yet another exemplary embodiment of the present disclosure provides a method of streaming a game including: executing a game according to a game event requested by a user terminal; displaying the executed game in a specific area of a display unit; capturing the game displayed in the specific area; and encoding the captured game and transmitting the encoded game to the user terminal.

The present disclosure relates to the game streaming system and method for supporting multiuser and multiplatform, which executes a game for multiuser in a server computer having high performance in an online game, and captures, encodes and streams images and sound of the executed game results in real time, to transfer game contents to a plurality of user clients.

Accordingly, the present disclosure is applied to an existing online game service, thereby achieving effects of optimizing hardware resources, minimizing unnecessary waste of resources, and supporting multiuser and multiplatform to enable the client terminal to execute a high specification game.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The present disclosure suggests a method of simultaneously executing multiple games in order to provide an online game service supporting multiple users in one server.

Figure 1:
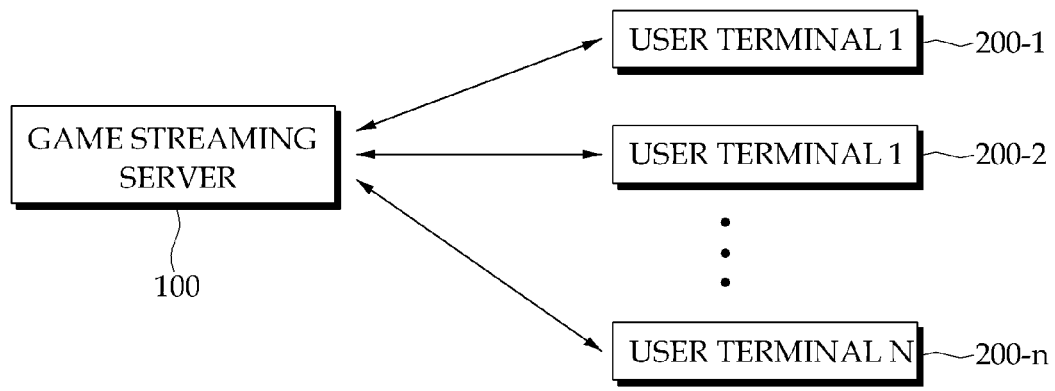
FIG. 1 illustrates a game streaming system for multiuser according to an exemplary embodiment of the present disclosure.

FIG. 1 illustrates a game streaming system for multiuser according to an exemplary embodiment of the present disclosure. Hereinafter, the game streaming system for multiuser according to the exemplary embodiment of the present disclosure will be described with reference to FIG. 1 in detail.

Referring to FIG. 1, the game streaming system includes a plurality of user terminals 200-1, 200-2, . . . and 200-n and a game streaming server 100. It is a matter of course that another configuration may be included in the game streaming system in addition to the aforementioned configuration.

The high performance game streaming server 100 performs execution of a game content and transfers the game content to the user terminal 200 by encoding and streamlining the game content in real time.

The user terminal 200 executes an executed game video transferred from the game streaming server 100, and transfers a user event generated according to the executed game video to the game streaming server 100. Such a scheme may have an effect identical to actual execution of the game without being affected by an environment, such as performance and an operation system of the user terminal 200, even without directly transplanting a game client into the user terminal 200. The user terminal 200 has only to perform a function, such as reproduction of a video and transmission of simple user input, thereby remarkably reducing an execution burden of the user terminal.

The game streaming server 100 serves to execute a user desired game. The game streaming server 100 actually executes the game, and transmits a result of the executed game to the user terminal 200, that is, a client, by encoding and then steaming the result of the executed game in real time. That is, the game streaming server 100 executes the game in correspondence to the event transferred from the user terminal, and provides the user terminal 200 with the result of the executed game after encoding the result of the executed game in real time. Accordingly, the game streaming server 100 stores information on a type of events providable by the user terminal 200 and an operation method of each event.

The user terminal 200 may include various terminals, such as a PC, a set-top box, a notebook computer, a smart terminal, a net-book computer and a mobile device, and aims to establish a thin-client platform in order to provide a game streaming service appropriate to all of the various terminals. In order to enable the game to be executed without being affected by a terminal environment, such as performance and an operation system of the user terminal 200, in the execution of the game, a video of the executed game is received from the game streaming server 100 and reproduced, and an event generated in the user terminal 200 is transferred to the game streaming server 100 in which the game is actually executed. That is, the user terminal 200 includes only a device for the video reproduction and the event input, and the game streaming server 100 serves all functions or operations related to the actual performance of the game.

The game streaming server 100 actually executes a UI and the game to be transmitted to the user terminal 200, and encodes executed contents into a video to transmit the encoded video to the user terminal 200. As described above, the game streaming server 100 transmits the UI related to the execution of the game to the user terminal 200, and transmits information on the type of events and a game execution command according to the operation of the corresponding UI. It is a matter of course that the game streaming server 100 also stores the corresponding information in a separate storage space.

As illustrated in FIG. 1, a plurality of user terminals may be connected to the one game streaming server 100, and a session management unit for managing the event input and the streaming transferred from each user terminal may be added to the game streaming server 100. That is, the game streaming server 100 separately manages information on the connected user terminal and the event input transferred from each user terminal.

When the user terminal 200 makes a request to terminate a game, the game streaming server 100 stores game contents under an agreement of the user terminal. That is, when a request for the execution of the same game is made from the same user terminal 200, the game streaming server 100 may provide the user terminal 200 with executed details of the existing game.

Figure 2:
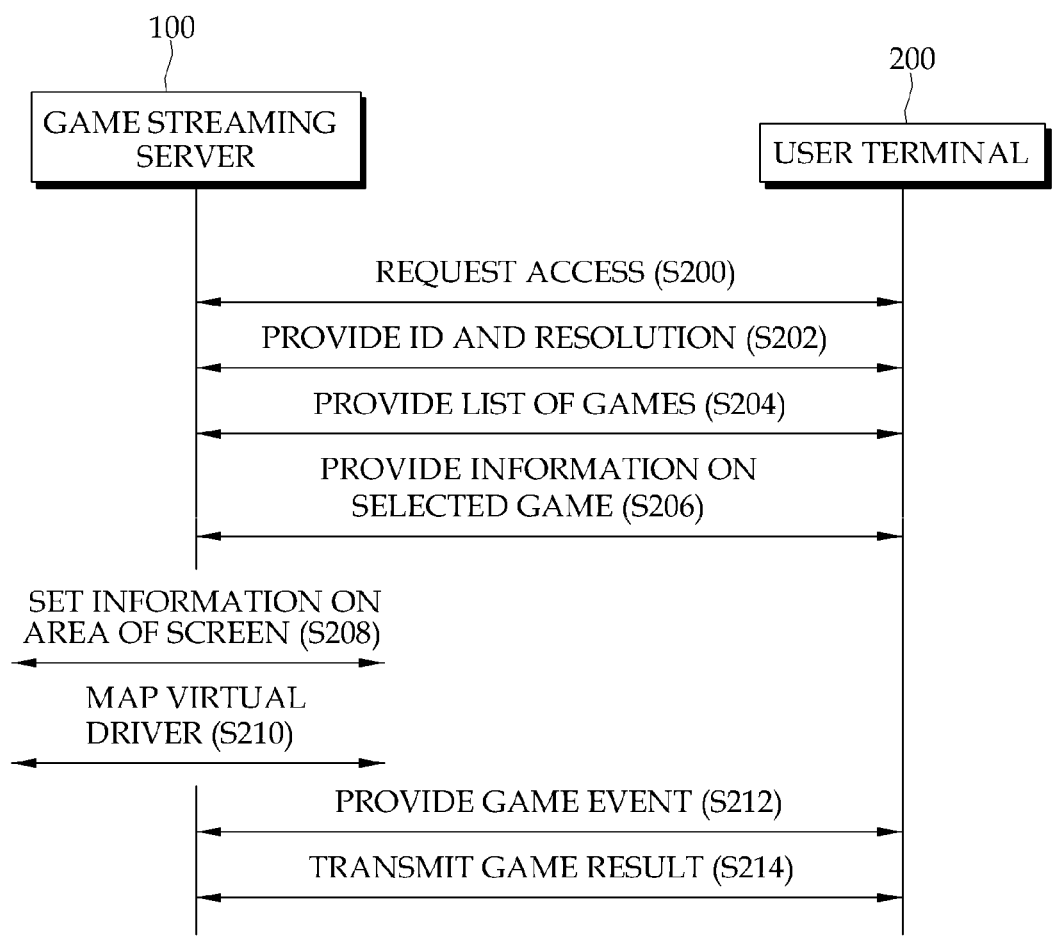
FIG. 2 is a flowchart illustrating an operation performed between a user terminal and a game streaming server according to an exemplary embodiment of the present disclosure.

FIG. 2 is a flowchart illustrating an operation performed between the user terminal and the game streaming server according to an exemplary embodiment of the present disclosure. Hereinafter, the operation performed between the user terminal and the game streaming server according to an exemplary embodiment of the present disclosure will be described with reference to FIG. 2 in detail.

In step S200, the user terminal makes a request for access to the game streaming server. That is, the user terminal accesses a URL of the game streaming server.

In step S202, when the game streaming server makes a request for a user ID and resolution to the user terminal, the user terminal provides the game streaming server with the user ID and the resolution.

In step S204, the game streaming server provides the user terminal with a list of games providable by the game streaming server.

In step S206, the user terminal selects a game desired to be actually executed from the list of games provided from the game streaming server, and provides the game streaming server with the selected game.

In step S208, the game streaming server sets an area of a screen to execute the corresponding game in the screen in which the game is executed, and stores the set area of the screen.

In step S210, the game streaming server maps a virtual driver to execute corresponding sound to the game to be executed in the set area of the screen. That is, the game streaming server divides the screen into a plurality of areas, and maps the game to be executed in each area to a virtual sound drive corresponding to the corresponding game.

In step S212, the user terminal transfers a game event to the game streaming server by using the received UI. As described above, the user terminal does not actually execute the game, but the game streaming server actually performs the game, and the user terminal executes a command for the execution of the game.

In step S214, the game streaming server executes the game according to the user event received from the user terminal, and encodes the executed result of the game and transmits the encoded result to the user terminal through the streaming.

Figure 3:
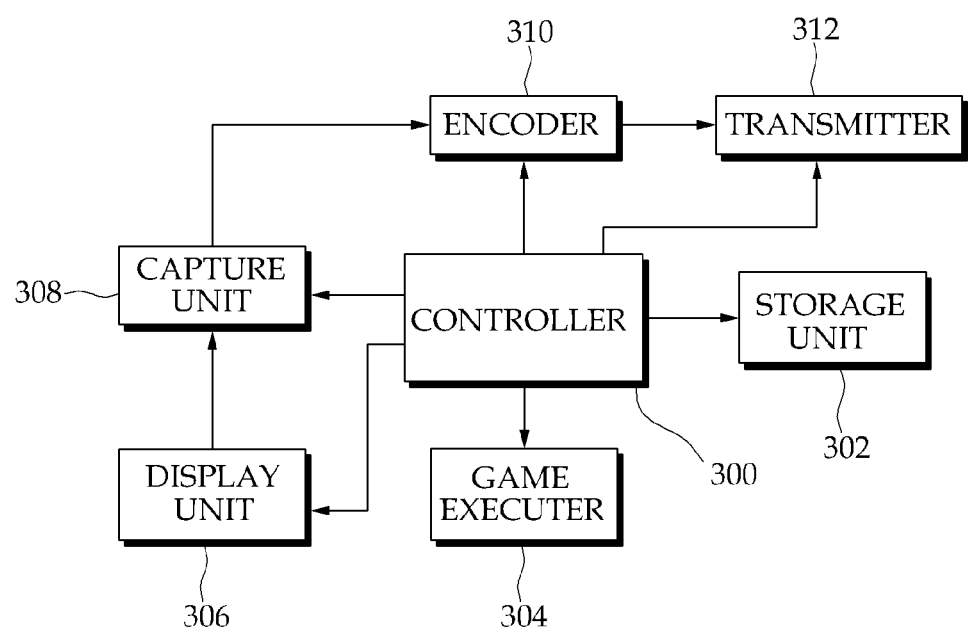
FIG. 3 illustrates a configuration of a game streaming server according to an exemplary embodiment of the present disclosure.

FIG. 3 illustrates a configuration of the game streaming server according to an exemplary embodiment of the present disclosure. Hereinafter, the configuration of the game streaming server according to an exemplary embodiment of the present disclosure will be described with reference to FIG. 3 in detail.

Referring to FIG. 3, the game streaming server includes a capture unit, an encoder, a transmitter, a controller, a storage unit, a game executer and a display unit. It is a matter of course that another configuration may be included in the game streaming server in addition to the aforementioned configuration.

When the user terminal logs in the game streaming server, the game streaming server receives user information (User ID) and resolution information (x, y) of the accessed client. The game streaming server transmits the list of games to the client making the request for the access. The user terminal selects a game to perform, and the game streaming server loads the selected game on a corresponding area by determining information on a position of the area of the screen and prepares the execution of the selected game.

The capture unit 308 is divided into an image capture unit and a sound capture unit. The image capture unit 308 executes the game requested by the user terminal and captures the image. That is, the image capture unit captures a corresponding area by using position information (x, y) stored in the storage unit. The sound capture unit sets a virtual sound drive of the corresponding game by using a launcher having a function of changing a physically set sound device to a virtual sound card, and captures game sound from the set virtual drive.

As described above, when information on the event input for the game execution by the user terminal is received, the game streaming server executes the game according to the input information on the event. The encoder 310 encodes the image and the game sound captured by the capture unit 308 in accordance with the resolution of the user terminal in real time. To this end, the encoder 310 includes an image encoder for encoding an image and a sound encoder for encoding game sound.

The transmitter 312 is executed according to key input, and transmits a stream in which the captured image and game sound are encoded in real time in accordance with the resolution of the client to the corresponding user terminal.

The storage unit 302 stores information on the user terminal making a request for the list of games and a game supportable by the game streaming server. The storage unit 302 stores a driving program for driving the game streaming server. In relation to the present disclosure, the storage unit 302 stores the information on the user terminal making the request for the game, the game requested by the corresponding user terminal, information on an area of the screen in which the corresponding game is executed, and a virtual sound drive for executing the corresponding game.

The game executer 304 executes the game according to the event requested by the user terminal. That is, the game executer 304 executes the game according to the event requested by each user terminal. Accordingly, the game executer 304 may have capacity capable of executing a plurality of games or execute a corresponding action in an external server.

The display unit 306 displays contents of the game executed in the game executer 304. The display unit 306 is configured to such that when the plurality of games is executed, the display unit 306 is divided into a plurality of areas and then one game is displayed on one area. Further, in the display unit 306, a size of the area in which the game is displayed may be varied according to the resolution of the user terminal. That is, when the resolution of the user terminal is high, the display unit 306 may display the game in a wide area, and when the resolution of the user terminal is low, the display unit 306 may display the game in a narrow area.

The controller 300 controls an operation of each constituent element included in the game streaming server. That is, the controller 300 sets a predetermined area of the screen and the corresponding virtual sound drive for executing the game to be provided to the user terminal making the request for the game. The controller 300 makes a control such that information on a predetermined area of the screen and a corresponding virtual sound drive set for each user terminal are stored in the storage unit 302. The controller 300 controls the game executer 304 such that the corresponding game is executed according to information on the event received from the user terminal. The controller 300 controls the capture unit 308 so as to capture an image and sound to be provided to the user terminal and controls the transmitter 312 so as to transmit the encoded sound and image in a form of the streaming.

Figure 4:
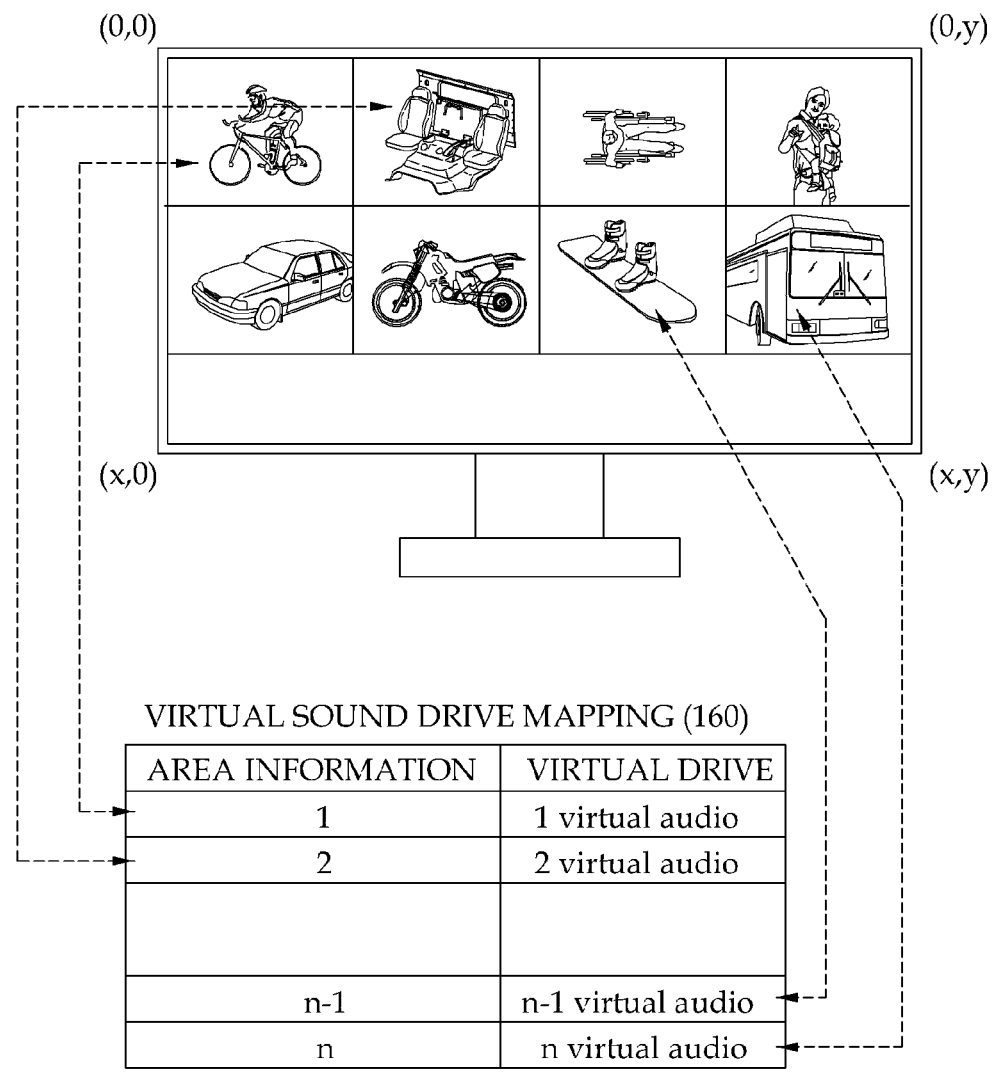
FIG. 4 illustrates an example in which games performed in a game streaming server are executed in multiple areas of a screen according to an exemplary embodiment of the present disclosure.

FIG. 4 illustrates an example in which games performed in the game streaming server are executed in multiple areas of a screen according to an exemplary embodiment of the present disclosure.

Referring to FIG. 4, a screen is divided into eight areas, and the game streaming server executes a game requested by the user terminal in one area among the eight areas. It is a matter of course that the number of divided areas of the screen may be actively changed according to the number of user terminals making a request for a game. When the number of user terminals making the request for the game increases, the number of divided areas of the screen may also increase, and when the number of user terminals making the request for the game decreases, the number of divided areas of the screen may also decrease. That is, when the number of user terminals making the request for the game is one, the game streaming server does not divide the screen and executes the game in the entire screen, and when the number of user terminals making the request for the game is nine, the game streaming server divides the screen into at least nine areas and executes the game.

A form in which a used virtual sound drive (audio drive) is mapped to each area is illustrated. That is, a game executed in a first area is mapped to a first virtual audio drive, a game executed in a second area is mapped to a second virtual audio drive, a game executed in an $n-1^{th}$ area is mapped to an $n-1^{th}$ virtual audio drive, and a game executed in an $n^{th}$ area is mapped to an $n^{th}$ virtual audio drive.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A game streaming server comprising:
    a game executer configured to execute a plurality of games, each game being executed in response to an input received from an associated user terminal, respectively;
    a display unit configured to display contents of each game of the plurality of games executed by the game executer, each game in one respective area among a plurality of areas of the display unit;
    a capture unit configured to capture, from the display unit, a respective image of the contents of each game of the plurality of games displayed in the display unit;
    an encoder configured to encode the respective image of each game captured by the capture unit in accordance with a resolution of the respective user terminal associated with each game; and a transmitter configured to transmit the encoded respective image of each game to the respective user terminal associated with each game,
wherein a number of areas of the display unit is varied according to a number of user terminals associated with one or more games of the plurality of games.

2. The game streaming server of claim 1, further comprising a sound driver configured to output respective sound of each game of the plurality of games executed in the game streaming server.

3. The game streaming server of claim 1, further comprising a sound capture unit configured to capture the respective sound output from each game of the plurality of games executed in the game streaming server.

4. The game streaming server of claim 3, further comprising an encoder configured to encode the respective sound captured by the sound capture unit for each game of the plurality of games.

5. The game streaming server of claim 1, further comprising a storage unit configured to store information on a list of games in the game streaming server and information on the respective user terminal associated with each game.

6. The game streaming server of claim 1, wherein the game streaming server stores the resolution of the respective user terminal associated with each game.

7. The game streaming server of claim 1, wherein a size of the respective area in which at least one game of the plurality of games is displayed is varied according to the resolution of the respective user terminal of the at least one game.

8. The game streaming server of claim 1, wherein the display unit includes a plurality of areas and each area is set to display a game corresponding to each user terminal connected to the game streaming server.

9. The game streaming server of claim 1, wherein the game streaming server maps a game to be displayed on each area of the display unit to a virtual sound driver to execute corresponding sound to the game.

10. A method of streaming a game in a game streaming server, the method comprising:
executing a plurality of games, each game being executed in response to a respective input received from a respective user terminal;
displaying a respective image of each of the executed games in a respective specific area of a display unit of the game streaming server, wherein the display unit includes a plurality of areas and each area is set to display a game corresponding to each user terminal connected to the game streaming server;
capturing, from the display unit, the respective image displayed in the specific area of the screen for each executed game;
encoding, for each executed game, the respective captured image in accordance with a resolution of the respective user terminal; and
transmitting, for each game, the respective encoded image to the respective user terminal,
wherein a number of areas of the display unit is varied according to a number of user terminals making a request to the game streaming server.

11. The method of claim 10, further comprising:
receiving information on a user and a user terminal from the user terminal; and
transmitting a list of games in the game streaming server to the user terminal.

12. The method of claim 10, further comprising setting an area of the display unit to display a game by using information on a corresponding user terminal.

13. The method of claim 10, further comprising setting a sound driver to output sound of at least one of the plurality of games.

14. The method of claim 10, further comprising capturing sound from a game displayed in a specific area of the display unit.

15. The method of claim 14, further comprising:
encoding the captured sound from the game; and
transmitting the encoded sound to a user terminal associated with the game.

16. The method of claim 10, wherein a size of a specific area of the screen is varied according to resolution of a user terminal.

17. The method of claim 10, further comprising mapping a virtual sound driver to execute corresponding sound to each game displayed in each area of the display unit.

* * * * *